(12) United States Patent
Mustafa

(10) Patent No.: US 8,336,304 B2
(45) Date of Patent: *Dec. 25, 2012

(54) HYDRAULIC HYBRID TURBO-TRANSMISSION

(76) Inventor: Rez Mustafa, Covina, CA (US)

( * ) Notice: Subject to any disclaimer, the term of this patent is extended or adjusted under 35 U.S.C. 154(b) by 545 days.

This patent is subject to a terminal disclaimer.

(21) Appl. No.: 12/623,879

(22) Filed: Nov. 23, 2009

(65) Prior Publication Data

US 2010/0064675 A1    Mar. 18, 2010

Related U.S. Application Data

(63) Continuation-in-part of application No. 12/145,469, filed on Jun. 24, 2008, now Pat. No. 7,810,322, which is a continuation-in-part of application No. 12/269,261, filed on Nov. 12, 2008, now Pat. No. 8,087,487, and a continuation-in-part of application No. 12/481,159, filed on Jun. 9, 2009.

(51) Int. Cl.
F16D 33/00   (2006.01)

(52) U.S. Cl. .................. 60/348; 60/424; 415/61

(58) Field of Classification Search ........... 60/335, 60/348, 414, 424; 415/61, 123
See application file for complete search history.

(56) References Cited

U.S. PATENT DOCUMENTS

| | | |
|---|---|---|
| 1,045,505 A | 11/1912 | Brauer |
| 1,122,972 A | 12/1914 | Maye |
| 1,374,164 A | 4/1921 | Nordwick |
| 1,528,164 A | 3/1925 | Nordwick |
| 1,654,378 A | 12/1927 | Marchetti |
| 1,688,968 A * | 10/1928 | Huwiler ................ 60/348 |
| 2,168,862 A | 8/1939 | Sensaud De Lavaud |
| 2,380,734 A | 7/1945 | Eastin |
| 2,469,085 A | 5/1949 | Sheppard |
| 2,671,543 A | 3/1954 | Bosh |
| 2,812,670 A | 11/1957 | Winther |
| 2,890,600 A | 6/1959 | Smirl et al. |
| 2,964,976 A | 12/1960 | Kelly |
| 3,250,149 A | 5/1966 | Jandasek |
| 3,517,652 A | 6/1970 | Albertson |
| 3,528,321 A | 9/1970 | Harmon et al. |
| 3,556,239 A | 1/1971 | Spahn |
| 3,557,635 A | 1/1971 | Tuck |
| 3,578,117 A | 5/1971 | Ahlen |
| 3,584,610 A | 6/1971 | Porter |
| 4,003,351 A | 1/1977 | Gunther |
| 4,013,048 A | 3/1977 | Reitz |
| 4,043,126 A | 8/1977 | Santos |
| 4,100,823 A | 7/1978 | Krist |

(Continued)

*Primary Examiner* — F. Daniel Lopez
(74) *Attorney, Agent, or Firm* — Kirk A. Buhler; Burhler & Associates

(57) ABSTRACT

Improvements in a transmission are provided for transferring power from a power source to a work unit. The pump transfers energy received from the power source into a fluid or gas. The first turbine is fixed to output shaft, and a plurality of additional turbines are fixed on either one-way overrunning clutches or multi-disc clutches and these clutches are fixed to the output shaft and after each turbine is a multi-valves that discharges the fluid or gas. After all of the multi-stage turbines a first planetary gear set connects the transmission to the vehicle or work unit. The second planetary gear set is located between the last turbine and the first planetary gear set. During braking the planetary gear set reverses turning direction of the turbines and convert the turbines into pumps where they will pump low pressure fluid to a high pressure accumulator.

13 Claims, 16 Drawing Sheets

U.S. PATENT DOCUMENTS

| | | | |
|---|---|---|---|
| 4,215,545 A * | 8/1980 | Morello et al. | 60/414 |
| 4,254,843 A | 3/1981 | Han et al. | |
| 4,274,253 A | 6/1981 | Bolliger et al. | |
| 4,314,160 A | 2/1982 | Boodman et al. | |
| 4,391,096 A | 7/1983 | Polzer et al. | |
| 4,459,945 A | 7/1984 | Chatfield | |
| 4,480,599 A | 11/1984 | Allais | |
| 4,545,336 A | 10/1985 | Waide | |
| 4,578,955 A | 4/1986 | Medina | |
| 4,624,110 A | 11/1986 | Levites | |
| 4,969,332 A | 11/1990 | Nancarrow et al. | |
| 5,088,357 A | 2/1992 | Kamada et al. | |
| 5,296,746 A | 3/1994 | Burkhart | |
| 5,584,355 A | 12/1996 | Burns | |
| 5,655,369 A * | 8/1997 | Folsom et al. | 60/414 |
| 5,680,032 A | 10/1997 | Pena | |
| 6,373,145 B1 | 4/2002 | Hamrick | |
| 6,378,287 B2 | 4/2002 | Griffiths | |
| 6,711,896 B1 | 3/2004 | Johnson | |
| 6,877,593 B2 | 4/2005 | Johnson | |
| 6,922,997 B1 | 8/2005 | Larson et al. | |
| 6,971,232 B2 * | 12/2005 | Singh | 60/414 |
| 6,976,467 B2 | 12/2005 | Fantuzzi | |
| 7,121,236 B2 | 10/2006 | Scuderi | |
| 7,322,193 B2 | 1/2008 | Bering et al. | |
| 7,810,322 B2 * | 10/2010 | Rez | 60/348 |
| 2001/0017122 A1 | 8/2001 | Fantuzzi | |
| 2006/0101800 A1 | 5/2006 | Rom | |
| 2007/0113803 A1 | 5/2007 | Froloff et al. | |
| 2007/0227801 A1 | 10/2007 | Loeffler | |
| 2008/0121196 A1 | 5/2008 | Fantuzzi | |

* cited by examiner

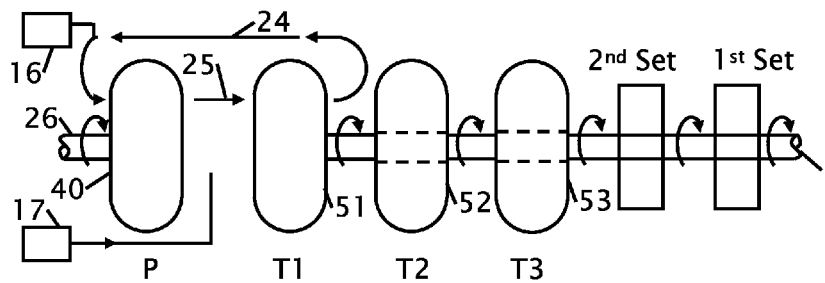
FIG. 4A
3rd Gear
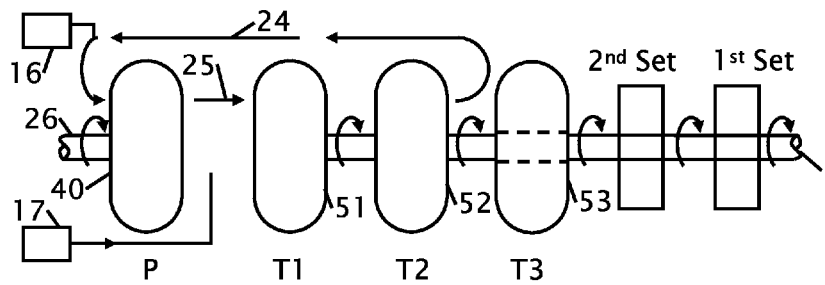
FIG. 4B
2nd Gear
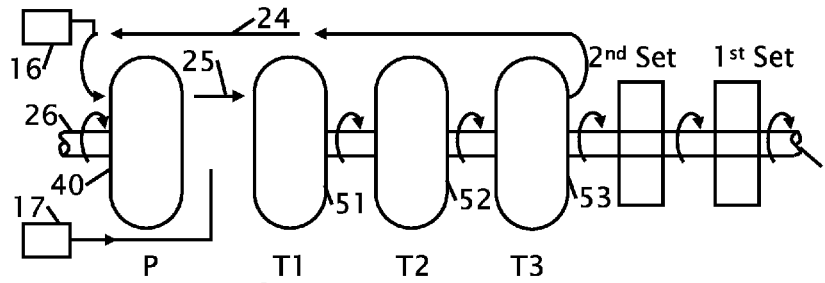
FIG. 4C
1rd Gear
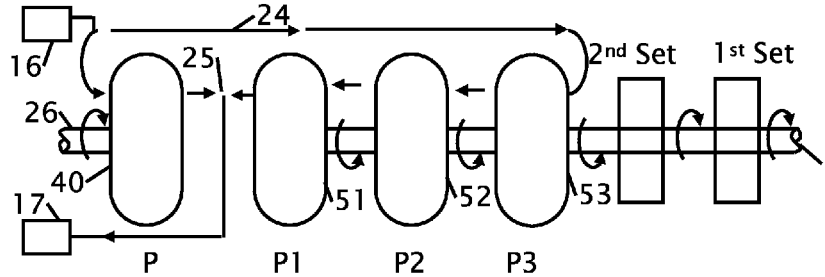
FIG. 4D
|  | Turbine 1 | Turbine 2 | Turbine 3 | Solenoid1 | Solenoid2 | Solenoid3 |
|---|---|---|---|---|---|---|
| 3rd Gear | ON | OFF | OFF | OFF | ON | ON |
| 2nd Gear | ON | ON | OFF | ON | OFF | ON |
| 1st Gear | ON | ON | ON | ON | ON | OFF |
| Braking | ON | ON | ON | ON | ON | OFF |
FIG. 4E

HYDRAULIC HYBRID TURBO-TRANSMISSION

CROSS REFERENCE TO RELATED APPLICATION

This application is a continuation-in-part of applicant's co-pending application Ser. No. 12/421,286 filed on Apr. 9, 2009 continuation-in-part of applicant's co-pending application Ser. No. 12/145,469 filed Jun. 24, 2008 and PCT/US09/40060 filed Apr. 9, 2009 which is a continuation-in-part of applicant's co-pending application Ser. No. PCT/US08/08139 filed Jun. 30, 2008 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

FIELD OF THE INVENTION

This invention relates to improvements power transmission between a motor to a vehicle and energy recovery from the breaking system. More particularly, the present hydraulic hybrid turbo transmission includes an input shaft coupled to a power source and to a pump that is configured to rotate with the input shaft. The hydraulic pump transfers energy received from the power source into a fluid. The transmission includes an output shaft and a multi-stage turbine in line with each other. The first turbine is fixed to output shaft, the rest of the turbines are fixed on either one-way overrunning clutches or multi-disc clutches and these clutches are fixed to an output shaft and after each turbine that has multi-valves to discharge the fluid or gas. After the multi-stage turbines a planetary gear set to redirect the operation of the vehicle from forward drive (D) or to neutral (N) or to reverse drive (R). Energy recovery is stored in a high pressure accumulator.

BACKGROUND OF THE INVENTION

Most automatic transmissions being used today normally have high fuel consumption because of the weight of the transmission, complicated system and does not meet economical driving conditions. Most manual transmission and automatic transmission are mechanical in nature and a portion of the time the speed and torque of the transmission does not match the speed and torque that is required by a vehicle or by other means. The transmission matches the speed of the vehicle but produces more or less torque that is required by the vehicle therefore there are some energy losses.

Hydraulic hybrid turbo-transmission is hydraulic transmission and is continuously variable transmissions therefore the speed and torque will match the speed and torque is required by the vehicle therefore less energy loss.

Modern automatic transmissions use four or more multiple-disc clutches where the clutch plate has rough frictional material on their faces. When the multiple-disc clutches are not applied the disc will run with engine or with transmission output therefore each disc acts as disc pump and will consume energy and produce heat in the transmission. Modern automatic transmission and manual transmissions use more than eight gears when the gears run with and without engagement with the output shaft or input shaft will act as a pump because of the teeth of the gear therefore they consume energy and produce heat in the transmission. Exemplary examples or hydraulic hybrid turbo transmission units are provided herein.

A hydraulic hybrid turbo transmission is a transmission and has the ability for energy recovery using low pressure storage and a high pressure accumulator to store recovered energy from braking.

The inventor's prior pending application Ser. No. 12/481,159, 12/269,261, PCT/US09/46745 and PCT/US09/4509 provides some initial features and functions that are further refined and elaborated in this application.

U.S. Pat. No. 2,890,600 issued Jun. 16, 1959 to R. L. Smirl et al., and U.S. Pat. No. 2,812,670 issued Nov. 12, 1957 to M. P. Winther both disclose a single stage hydraulic transmission where a viscous fluid transfers power between two vanes. These two patents disclose the early stages of a torque converter where rotational speed of the motor created connected the engine to the drive wheels. While these transmissions disclose power transmission they are limited to only a single speed with a multi-speed gearbox.

U.S. Pat. No. 2,671,543 issued Mar. 9, 1964 to J. Bosch discloses a fluid transmission system. The fluid transmission system uses two opposing turbines separated by a gap. Both the engine speed and the gap distance are variable to provide some additional speed variation between the motor and the driven wheels. While this patent discloses a more variable speed system the transmission has only one gear and is therefore limited in the range of speed control.

U.S. Pat. No. 4,100,823 issued Jul. 18, 1978 discloses an automatic transmission having a hydrodynamic torque converter between the input shaft and the gear system. The torque converter can be disengaged from the gear system to allow for changing of the gear ratio before re-engaging the torque converter. While this patent uses a hydrodynamic torque converter, gears are still used to change the ratio turning ration of the input to output shaft.

U.S. Pat. No. 4,624,110 issued Nov. 25, 1986 to Harry H. Levites discloses a fluid powered turbine using multiple turbines. The multiple turbines are configured in a tapers housing where the velocity of the fluid within the housing is increased as the fluid passes though a smaller cross sectional area thereby increasing the rotating speed of each turbine placed further down the tapered housing. While this patent describes the use of multiple turbine blades it operates as a steam turbine to generate power from steam entering the system. The generation of the pressure to turn the turbines is created external to the system as opposed to between turbines.

U.S. Published application 2005/0016167 that was published on Jan. 27, 2005 to Rodney Singh discloses a Hydraulic drive system and improved filter sub-system therefore. This hydraulic drive system uses an accumulator to store pressurized fluid in a tank and the pressurized fluid is later used to drive the vehicle. While this application shows a storage tank the fluid is not pressurized from the braking system and further does not use a second pump to increase the stored pressure. There system requires a transmission, pump and pump/motor as a separate system.

U.S. Pat. No. 7,337,869 issued Mar. 4, 2008 to Charles Gray Jr., discloses a Hydraulic hybrid vehicle with integrated hydraulic drive module and four-wheel-drive, and method of operation thereof. The drive system uses a motor to drive a hydraulic pump that provides hydraulic power to drive the vehicle as a two wheel or four wheel drive vehicle. Accumulator of hydraulic pressure does not pass through a two stage pump to increase the pressure for storage. There system requires a transmission, pump and pump/motor as a separate system U.S. Pat. No. 7,082,757 issued Aug. 1, 2006 to Chris Terlak discloses a Pump/motor operating mode switching control for hydraulic hybrid vehicle. This patent discloses allowing the hydraulic pump/motor to change between the two modes of operation based upon the vehicle being accelerated or stopping. When the brake pedal is depressed the motor turns into a pump and pressurizes hydraulic fluid into a reservoir and the pressurized fluid is later used to accelerate the vehicle. While this application pressurizes fluid from regenerative braking the system does not provide for a two stage pump and further does not use the motor as a transmission for the drive wheels. There system requires a transmission, pump and pump/motor as a separate system What is needed is a transmission with multiple turbines that are individually controlled and connected with one-way clutches to the output shaft. The proposed application provides this solution in a simple single unit and there is not a need for the pump and motor for energy recovery from the braking system. The proposed solution is a simple single unit that works either as a pump/motor or a pump plus pumps. Therefore there is not a need for an outside unit such as a pump/motor or a pump.

BRIEF SUMMARY OF THE INVENTION

It is an object of the hydraulic hybrid turbo-transmission to operate without frictional disc clutched or gears that create heat that results in a loss of energy.

It is an object of the hydraulic hybrid turbo-transmission to create a hydraulic hybrid turbo-transmission that is simpler and has fewer components than a modern automatic transmission. Only one controller is used with a few solenoid valves where the solenoids control by the transmission module (TCM) and that the transmission acts as an automatic transmission. Manual shifting can be done by operating the solenoid valves manually to act as a manual transmission or by (TCM). It is simpler in operation and less expensive than modern automatic or manual transmissions.

It is another object of the hydraulic hybrid turbo-transmission to eliminate a torque converter. The torque converter is not required in the hydraulic hybrid turbo-transmission and therefore more energy is saved from efficiency loss and weight reductions.

It is another object of the hydraulic hybrid turbo-transmission to be used in all vehicles from small vehicles to large vehicles by changing the surface are of the turbine blades and or the angle of the turbine blades and or by using two or more pumps inline for heavy equipment such as trucks, tractors or bulldozers It is still another object of the hydraulic hybrid turbo-transmission to be used in other application such as pump drivers by using the motor as a power source where the hydraulic hybrid turbo-transmission acts as a variable torque drive or variable speed drive for the pump and other applications.

It is still another object of the hydraulic hybrid turbo-transmission to operate for energy recovery from the vehicle's braking system without the need for an outside pump/motor.

Various objects, features, aspects, and advantages of the present invention will become more apparent from the following detailed description of preferred embodiments of the invention, along with the accompanying drawings in which like numerals represent like components.

BRIEF DESCRIPTION OF THE DRAWINGS

FIG. 4A-4E shows a three speed hydraulic hybrid turbo-transmission and the fluid flow through each of the three speeds.

DETAILED DESCRIPTION

Figure 1:
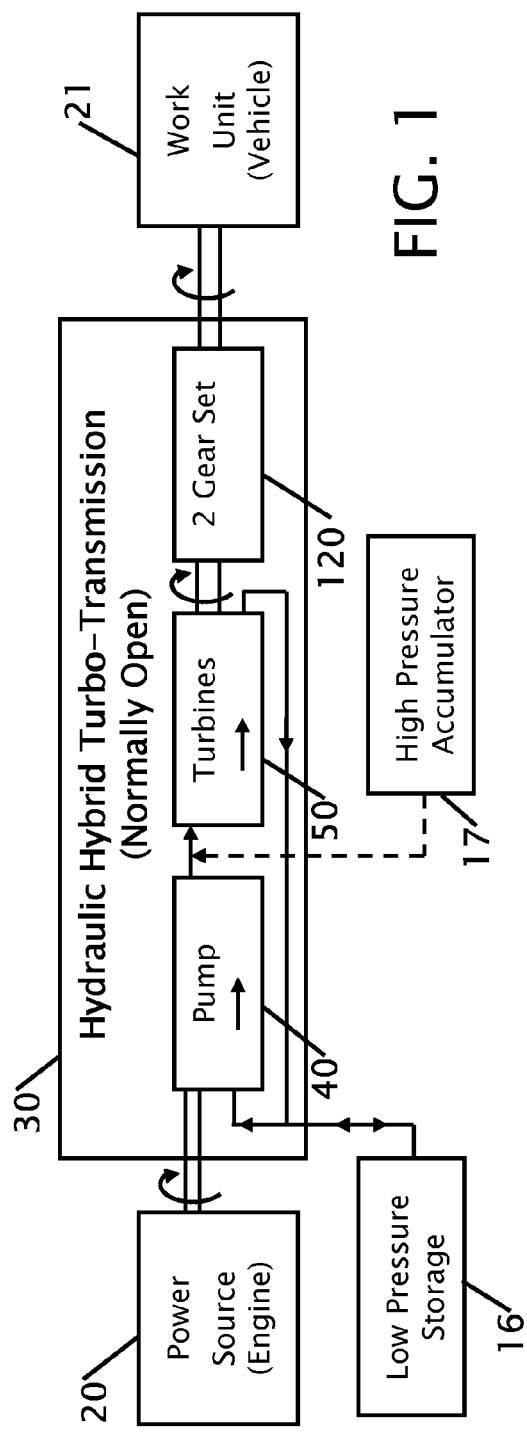
FIG. 1 shows a block diagram of the hydraulic hybrid turbo-transmission connected between an engine and a vehicle under normal operation.

FIG. 1 shows a block diagram of the hydraulic hybrid turbo-transmission connected between an engine and a vehicle. From this block diagram a power source 20 such as an engine or motor is connected to the hydraulic hybrid turbo-transmission 30. Within the transmission is a pump 40, fluid coupled to turbines 50 and then coupled to a gear set 120. The hydraulic hybrid turbo-transmission 30 is then connected to a work unit 21 such as a vehicle. A low pressure fluid storage 16 and a high pressure fluid accumulator.

Figure 2:
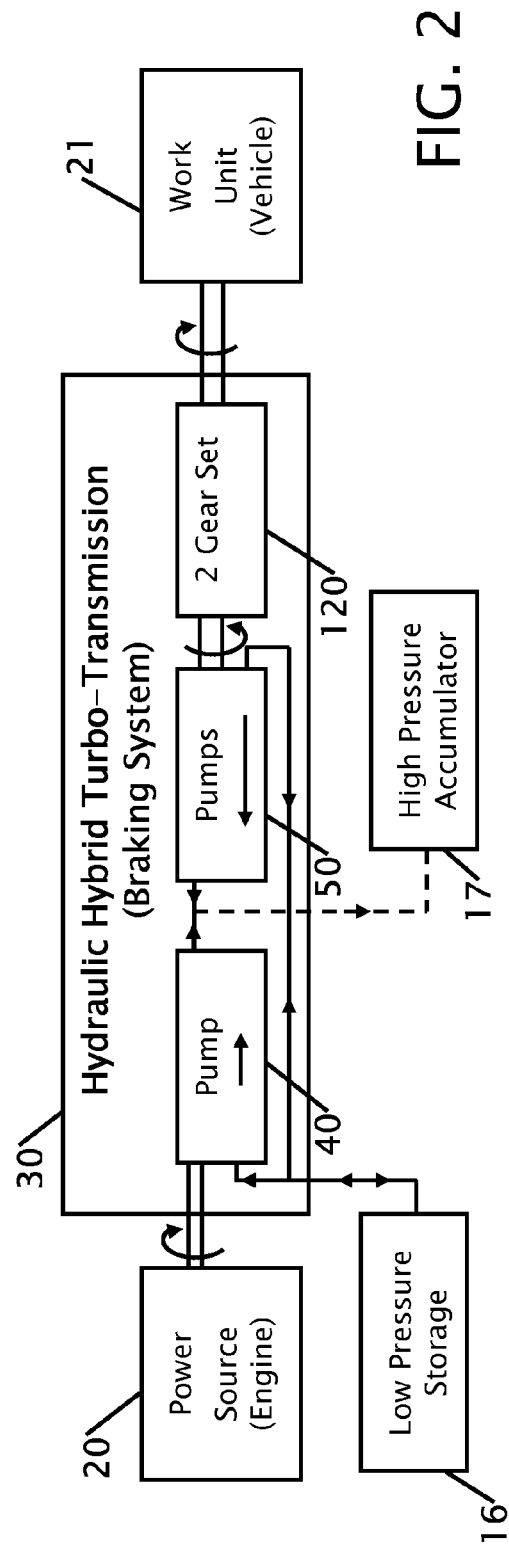
FIG. 2 shows a block diagram of the hydraulic hybrid turbo-transmission during braking condition.

FIG. 2 shows a block diagram of the hydraulic hybrid turbo-transmission during braking. From this block diagram a power source 20 such as an engine or motor is connected to the Hydraulic hybrid turbo-transmission 30. Within the transmission is a pump 40 and turbine 50 that acts as a fluid coupled to turbines 50 that act as pumps by reverse rotation of the turbines 50 on the shaft by a second gear set. A low pressure fluid storage 16 and a high pressure fluid accumulator 17. The Hydraulic hybrid turbo-transmission 30 is then connected to a work unit 21 such as a pump or other uses.

Figure 3:
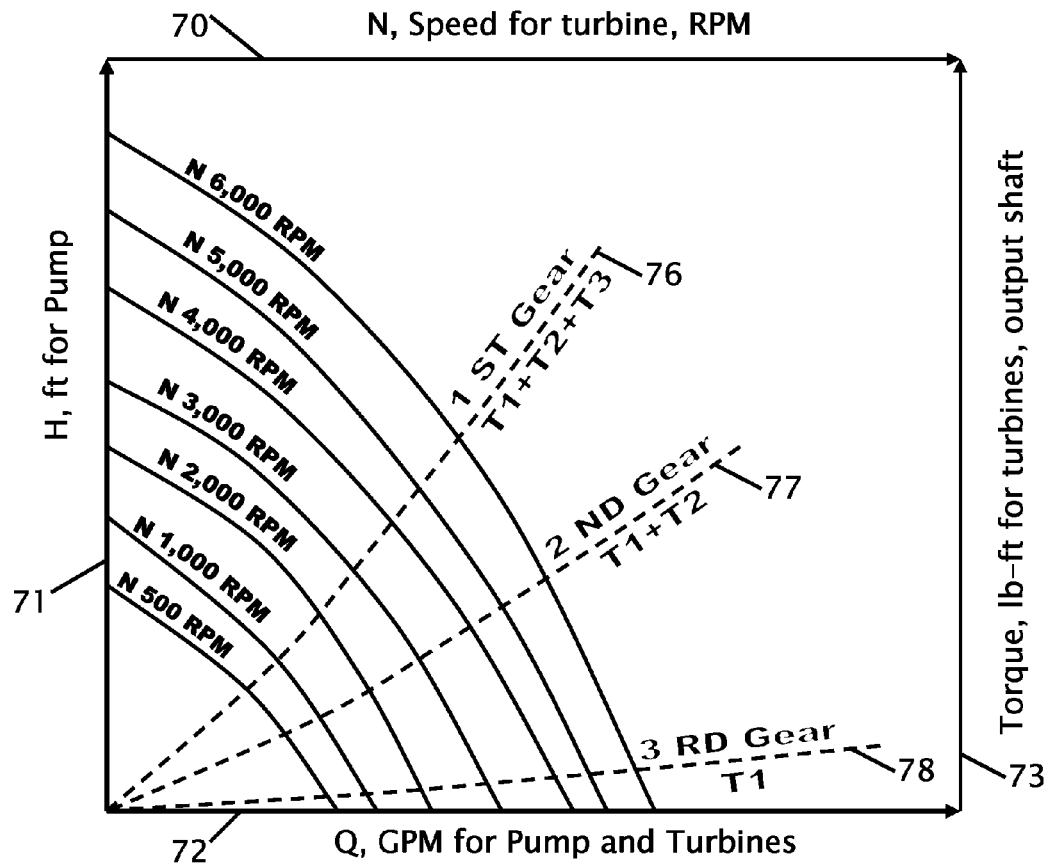
FIG. 3. Shows a system curve for a three speed hydraulic hybrid turbo-transmission.

FIG. 3. Shows a system power curve for the Hydraulic hybrid turbo-transmission. The left vertical axis 71 is head in ft for a pump. The right vertical axis 73 is Torque in lb-ft for turbines on an output shaft. The upper horizontal axis 70 is N for the speed for a turbine in Revolutions per Minute (RPM). The bottom horizontal axis 72 is Q for Gallons per Minute (GPM) for a pump or turbine. Solid curved lines 74 represent system curves for a pump at different N, RPM(s). Dashed curved lines 75 represent system curves for turbines. From these curves the $1^{st}$ Gear curve 76 shows the first gear, Turbine 1 (T1)+Turbine 2 (T2)+Turbine 3 (T3) in operation. The curve of $2^{nd}$ Gear 77 shows the second gear, Turbine 1+Turbine 2 in operation. The curve of $3^{rd}$ Gear 78 shows the third gear, Turbine 1 in operation. The turbines and gears are described in more detail with FIGS. 4a-4d.

FIG. 4A-4E shows a three speed Hydraulic hybrid turbo-transmission and the fluid flow through turbines. The chart shown in FIG. 4E identifies the activation of the three solenoids to allow flow through the three turbines. The solenoids are designated as ON or OFF and their activation or de-activation allows or prevents flow from the pump 40 through the turbines 51-53. When any solenoid valve is on (closed) no flow will exist to the solenoid valve and the valve is OFF (open) flow will be allowed to pass though the valve. FIG. 4A represents a third gear where solenoid 1 is OFF and 2 and 3 are ON. Input shaft 26 turns pump 40 that supplies output flow 25 through turbine (T1) 51. Because solenoids 2 and 3 are ON no flow is made through turbines (T2) 52 or (T3) 53. Roller clutches in these turbines allow the turbine to free spin on the output shaft 90. FIG. 4B represents second gear where solenoid 2 is OFF and solenoids 1 and 3 are ON. Input shaft 26 turns pump 40 that supplies output flow 25 through turbine (T1) 51 and turbine (T)2 52. Because solenoid 2 is OFF no flow is made through turbine or (T3) 53. Roller clutch in this turbine allow the turbine to free spin on the output shaft 90. FIG. 4C represents first gear where solenoid 3 is OFF and solenoids 1 and 2 are ON. Input shaft 26 turns pump 40 that supplies output flow 25 through turbines (T1) 51, (T2) 52 and (T3) 53 that turn the output shaft 90. Return flow 24 goes from the turbines back to the pump 40. FIG. 4D shows the turbines acting as pumps in braking. During braking the turbines act as pumps. During braking the turbine shaft will turn in the reverse direction by the second planetary gear set 120 (shown in FIG. 11) and then the turbines will act as a pumping system. The engine will turn the pump 40 and the braking system will turn pumps 1, 2 and 3 that will pump the low pressure fluid 40 to a higher pressure fluid 25 into the accumulator 17.

Figure 5:
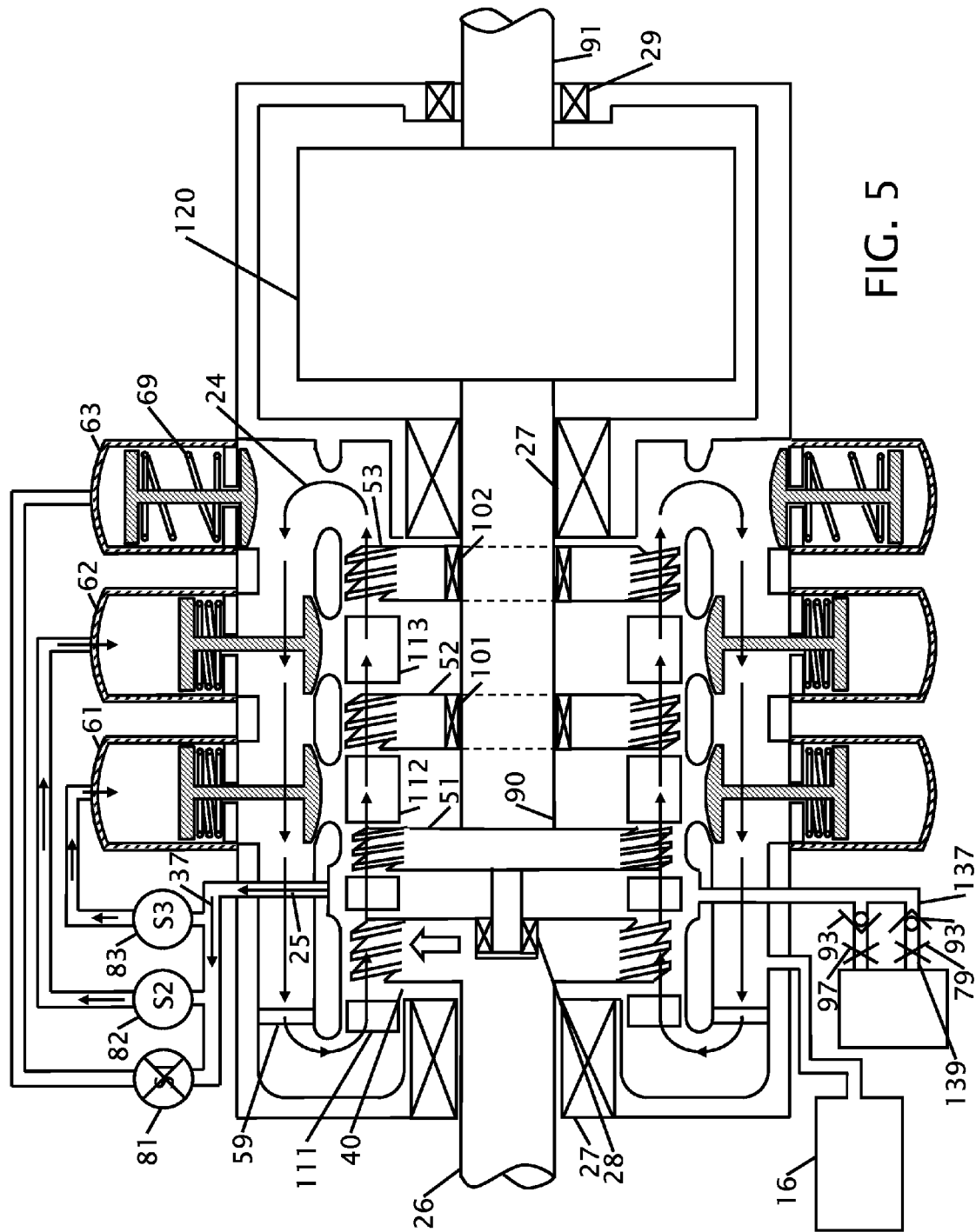
FIG. 5 shows a side cross sectional view of a three speed hydraulic hybrid turbo-transmission without a clutch.
Figure 15:
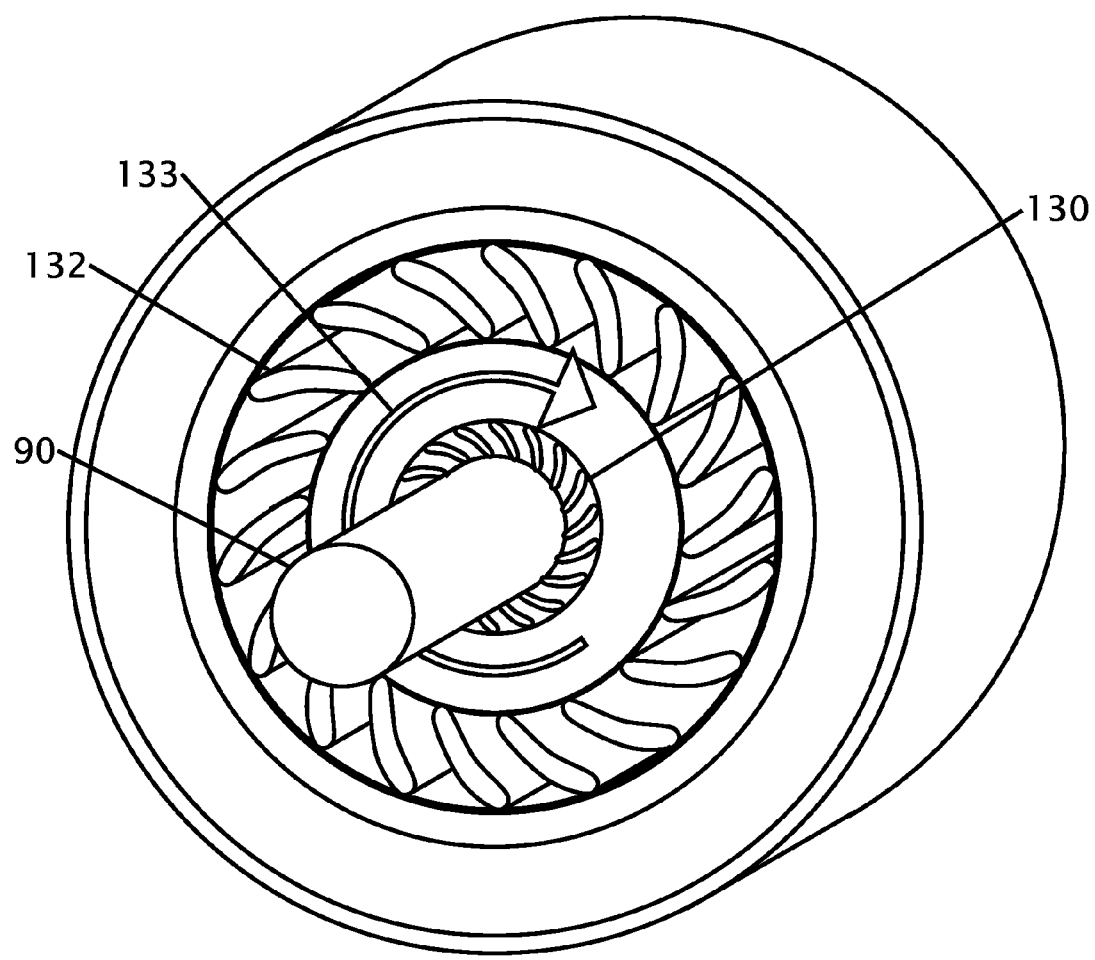
FIG. 15 shows a partial isometric view of one-way overrunning clutches or roller clutches that connect the speed turbines to the driven shaft.
Figure 16:
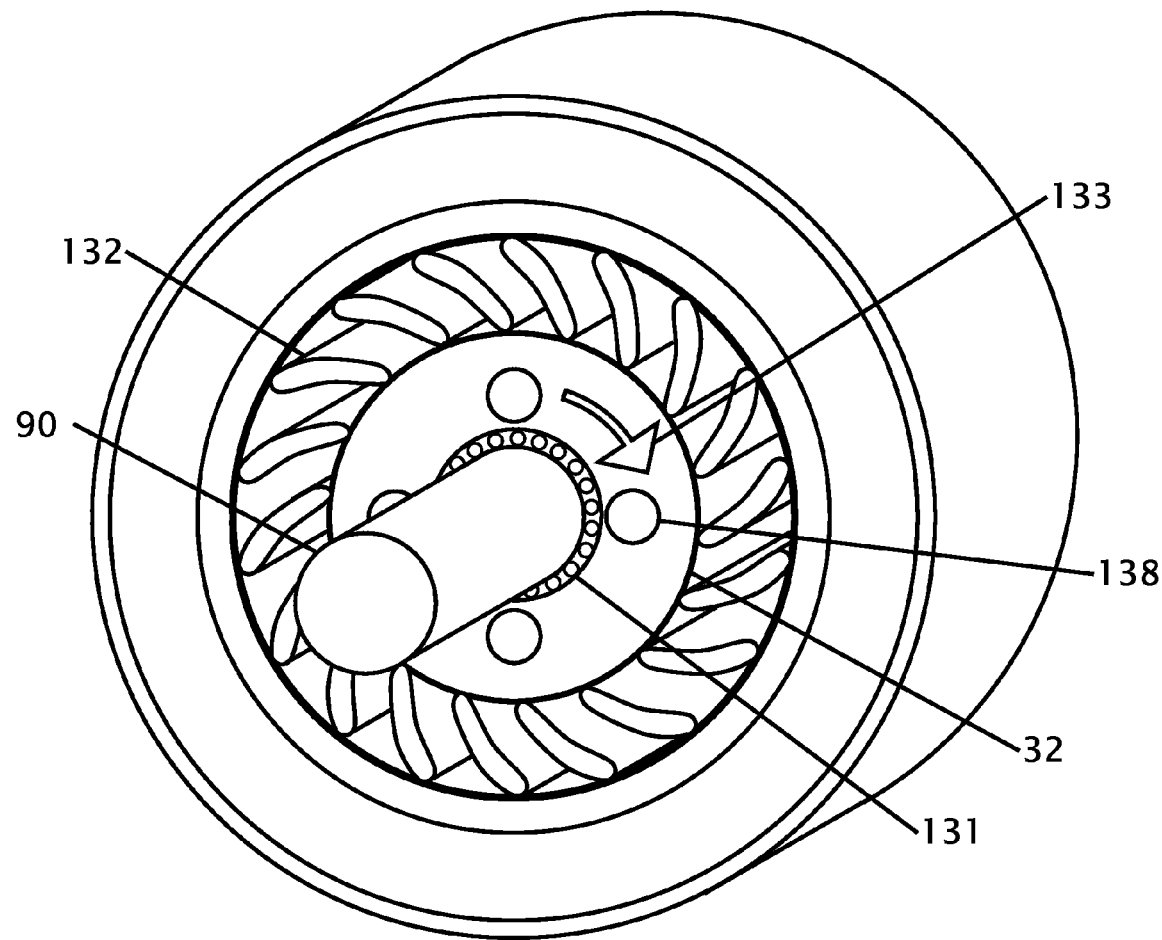
FIG. 16 shows a partial isometric view of a multiple disc clutch that connects the speed turbines to the driven shaft.
Figure 18:
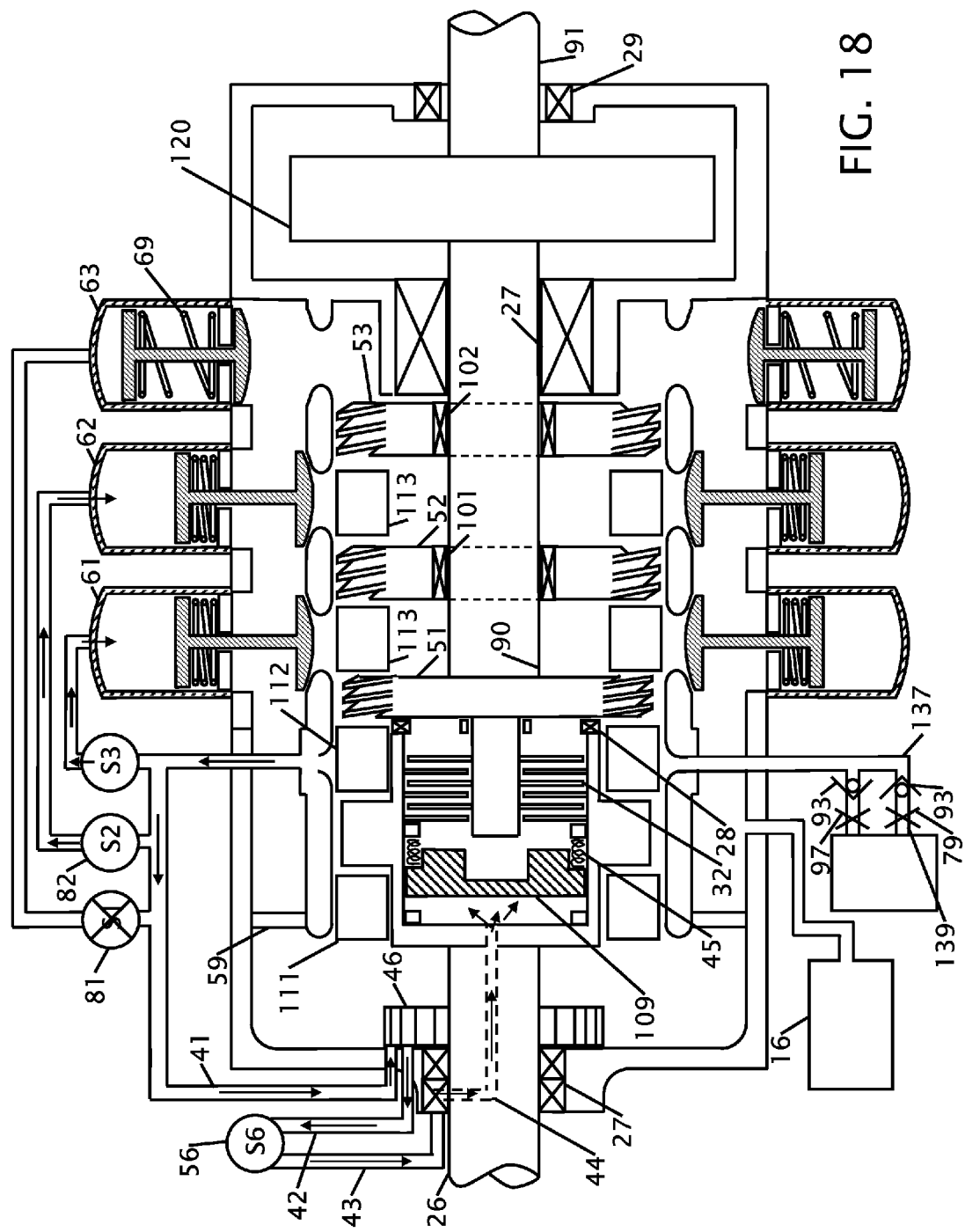
FIG. 18 shows a side cross sectional view of a three speed hydraulic hybrid turbo-transmission with a direct drive clutch.

FIG. 5 shows a side cross sectional view of a three speed hydraulic hybrid turbo-transmission without a clutch. FIG. 18 shows a side cross sectional view of a three speed hydraulic hybrid turbo-transmission with a clutch for direct drive as another contemplated option. The hydraulic hybrid turbo-transmission is essentially round and where the piston components are shown on the top of this figure are also shown on the bottom of this figure. A brief look at FIGS. 15 and 16 show a cross section view of a set of three valves around the hydraulic hybrid turbo-transmission and each of the three sets has eight valves it is contemplated that more or less than eight valves can be used. Rotational bearings 27, 28 and 29 support the various input 26 and output 90 shafts as the power is transmitted to the input shaft 26 through the pump hydraulic hybrid turbo-transmission to the output shafts 90 and 91. In operation input shaft 26 is turned by a motor or the like. When input shaft 26 is turned it will turn pump 40. A portion of the flow 37 will be used to operate solenoids 81-83 that control valves 61-63 that allow one or more of the turbines 51-53 to turn. Valves 61-63 are maintained in the open position with spring(s) 69. A multi-check valve 59 prevents high pressure from flowing back through stream 24 when the engine is not turning.

The output flow 25 from pump 40 will push against first turbine 51 and will turn the turbine on. Output flow from turbine 51 will push through the nozzle 112 to redirect flow to turbine 52 and will turn the turbine on. The flow then goes through nozzle 113 to redirect the flow to another turbine 53 and turn the turbine on and then the flow 24 will return back to the pump through nozzle 111. The pressure after the pump 40 will be larger than the pressure at the nozzle 112. The pressure through each successive turbine will drop gradually as the fluid flows though each turbine. Specifically the pressure at nozzle 112 will be greater than the pressure at nozzle 113 and the pressure at nozzle 113 will be larger than the pressure after turbine 53.

In this figure flow 37 is shown passing through only valves 82 and 83 because valve 81 is closed. Flow through the solenoids 82 and 83 then flows into valves 61 and 62 that block flow from returning 24 back to the pump. The output flow will push through nozzles 112 and 113 to turn their respective turbines. Turbines 52 and 53 are connected to the shaft with one-way clutches 101 and 102 the turn the shaft and also allow the turbines 52 and 53 to free spin on the shaft when flow, or insufficient flow, is not running though the turbines. Two planetary gear sets 120 are located after the hydraulic hybrid turbo-transmission. The energy recovery system is shown and described in more detail in FIG. 8.

Figure 6:
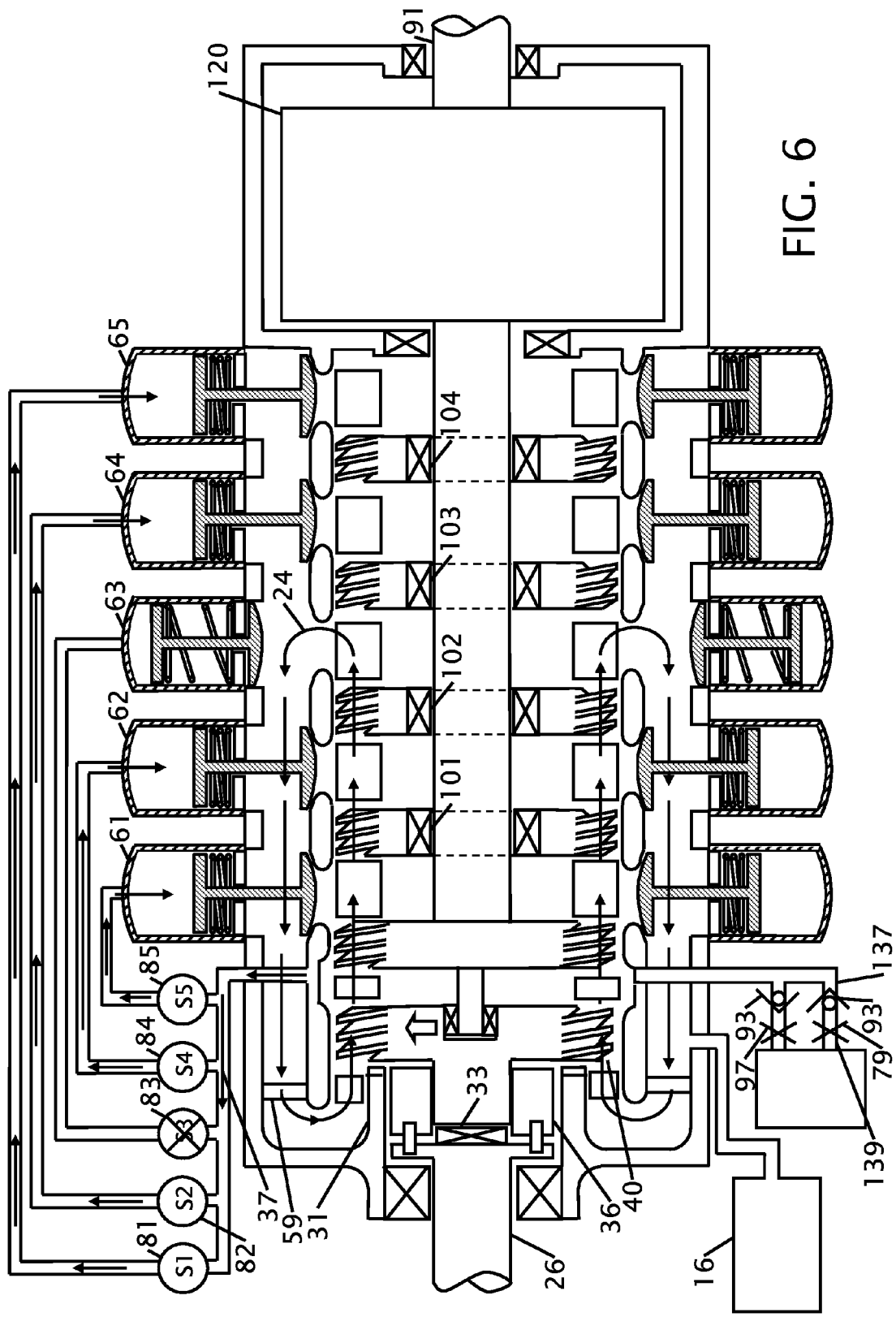
FIG. 6 shows a side cross sectional view of a five speed hydraulic hybrid turbo-transmission.

FIG. 6 shows a side cross sectional view of a five speed Hydraulic hybrid turbo-transmission. The transmission shown in this figure is similar to the transmission shown in FIG. 5. The major differences are that this transmission has five turbines to simulate a three speed transmission and a permanent planetary gear set overdrive 36 exists between the input shaft 26 and the pump 40 turbines. Output flow 25 from the pump 40 is fed to the solenoids 81-85 and the turbines. In this figure solenoid 83 is off therefore the valve 63 is open. When this valve 63 is open return flow 24 will flow back to the pump 40. The remaining valves 61, 62, 64 and 65 will be closed and no flow will go through the opening to pump 40. In this figure the turbines are connected to the shaft 90 with one-way clutches 101-104. Flow to and through a turbine will turn on the turbine and engage the clutch(s). When there in minimal or insufficient flow the turbine will free spin on the shaft.

Figure 7:
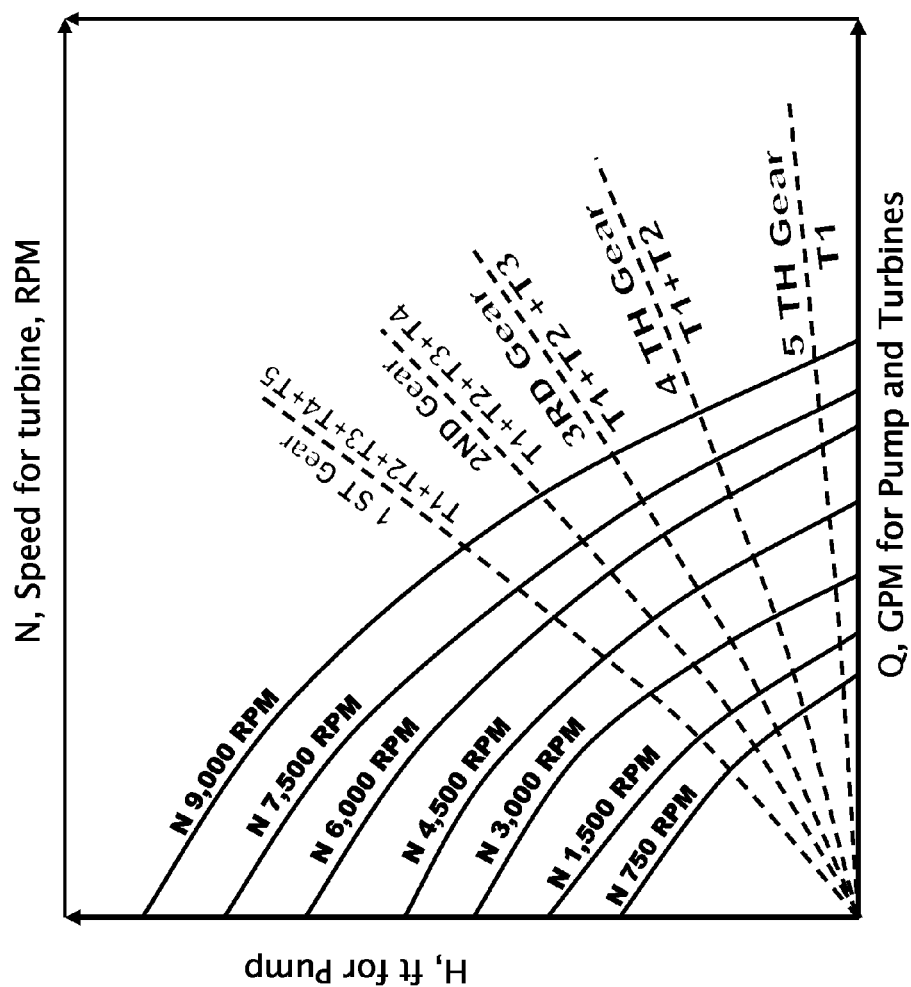
FIG. 7 shows a system curve for a five speed hydraulic hybrid turbo-transmission.

FIG. 7. Shows a system curve for a five speed hydraulic hybrid turbo-transmission. The transmission shown in this figure is similar to the three speed transmission in shown and described in FIG. 3 except the speed of the pump 74 will be higher than the speed of the engine because of a permanent planetary overdrive that is located between the engine and the pump.

Figure 8:
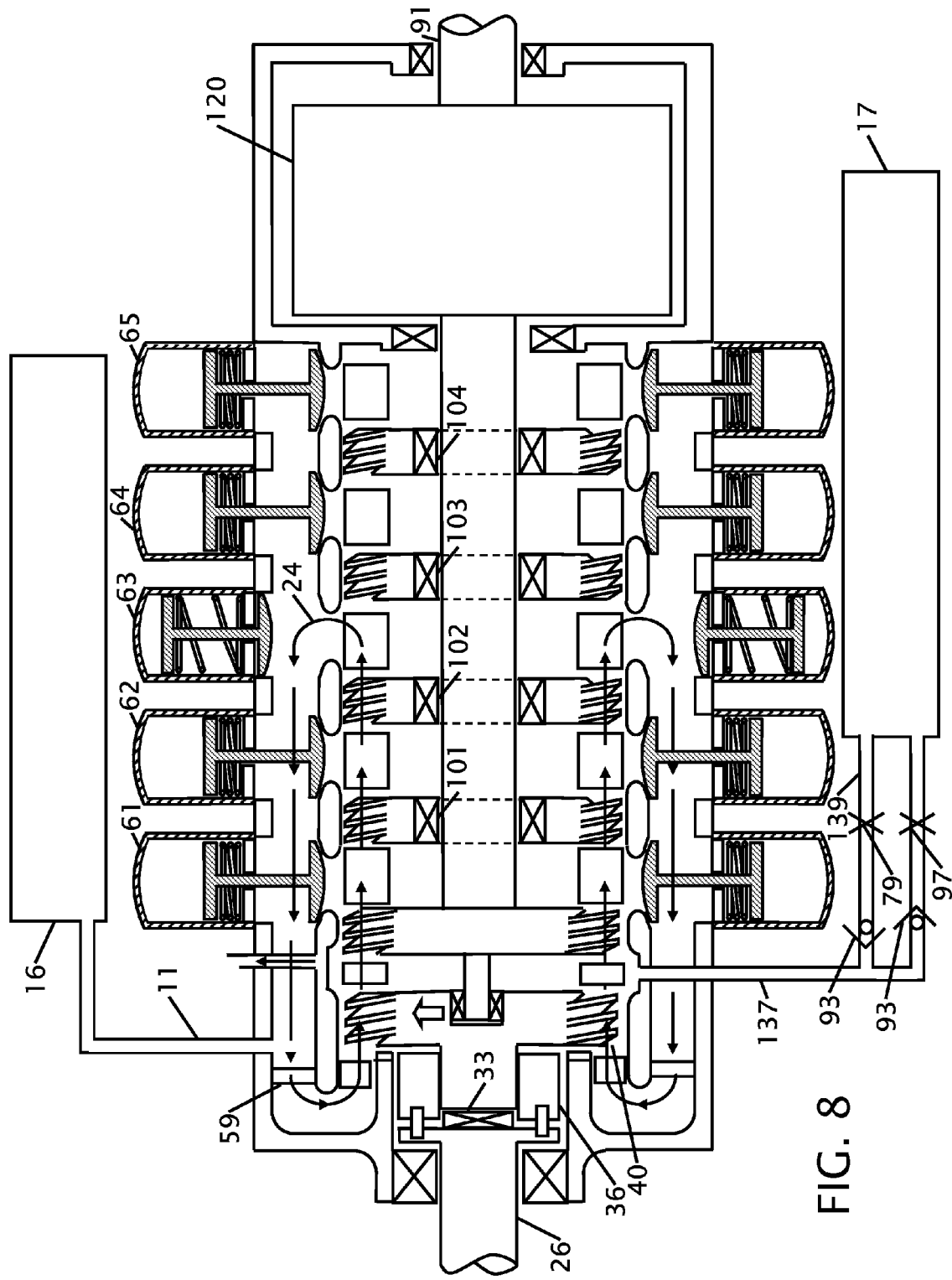
FIG. 8 shows the five speed hydraulic hybrid turbo transmission with two planetary gears with a reservoir and an accumulator.
Figure 11:
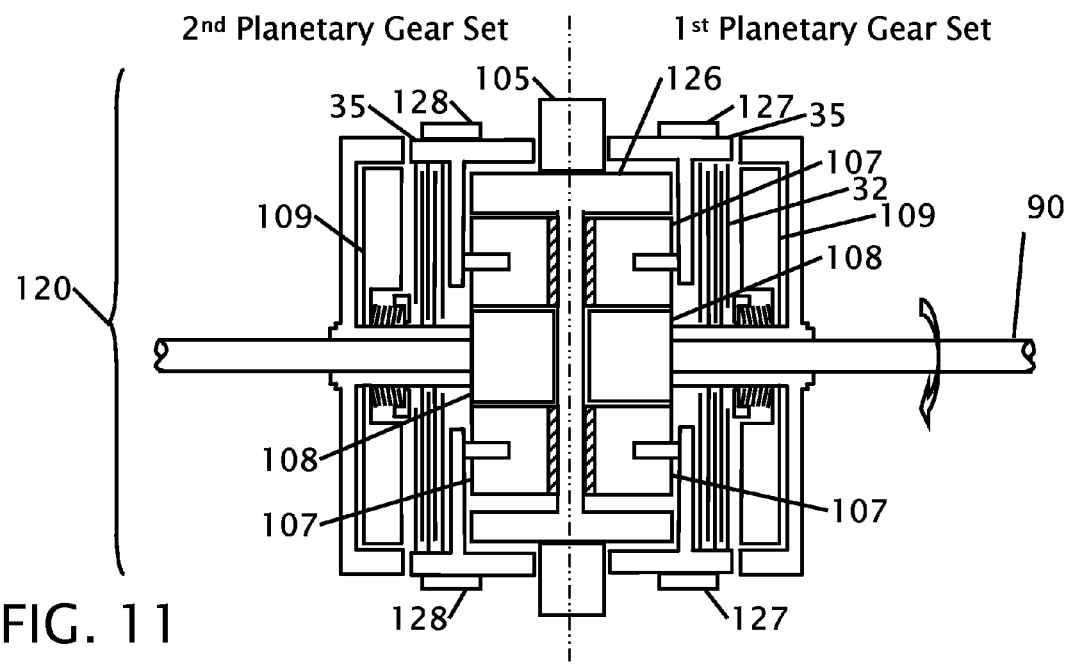
FIG. 11 shows a side cross sectional view of two planetary gear sets.

FIG. 8 shows the five speed hydraulic hybrid turbo transmission with two planetary gears 120 that are shown and described in FIG. 11. The first gear set is used in the vehicle for forward, neutral and reverse modes. The second gear set is also used for turbine operation. Under normal operation the gear set sits in a forward mode and the turbines work as motors. When the brakes are applied the gear set sits in the reverse modes and the turbines operate as pumps. During braking mode the pump 40 is uses the energy from the engine as power recovery and the pumps (turbine/pumps) use the energy from the braking system. All of the pumps use the low pressure flow 24 and send the outlet flow 25 to the high pressure accumulator 17 through conduit, line or pipes 137 and 139. Conduit 139 has a check valve 93 and a valve 79 that opens during braking. When the gas pedal of the vehicle is depressed, valve 97 will open to allow high pressure fluid through a throttling valve 97, check valve 93 and into the transmission where it will turn the turbines 101-104 to move the vehicle.

Figure 9:
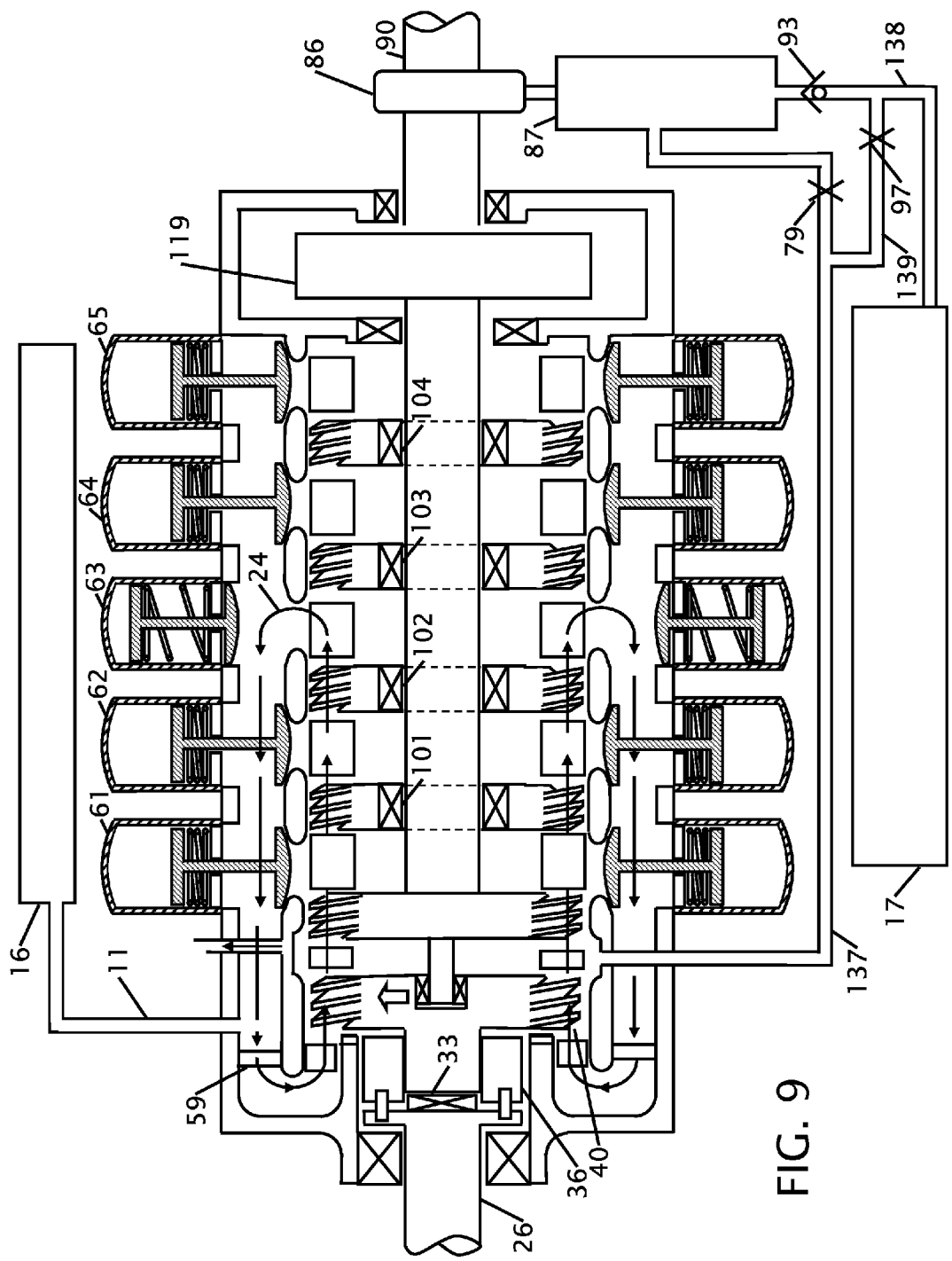
FIG. 9 shows the five speed hydraulic hybrid turbo transmission with one planetary gear set and one pump.

FIG. 9 shows the five speed hydraulic hybrid turbo transmission with a drive motor with a reservoir and a high pressure storage tank. This is another preferred embodiment of the hydraulic hybrid turbo transmission where a low pressure fluid storage tank 16 holds and supplies hydraulic fluid to the system. This embodiment also has a high pressure fluid accumulator 17. When the brakes are applied valve 79 will open and hydraulic fluid will be pumped from the pump 40 through pipe 137 and into a second pump 87 that is driven by drive 86 that will further increase the pressure of the hydraulic fluid and pump the higher pressure fluid into the high pressure accumulator 17. When the user presses the accelerator of the vehicle, valve 79 will be closed and, throttling valve 97 will open and high pressure hydraulic fluid will be passed back through pipe or tube 137 back into the hydraulic hybrid turbo transmission where it will turn the transmission and propel the vehicle.

Figure 10:
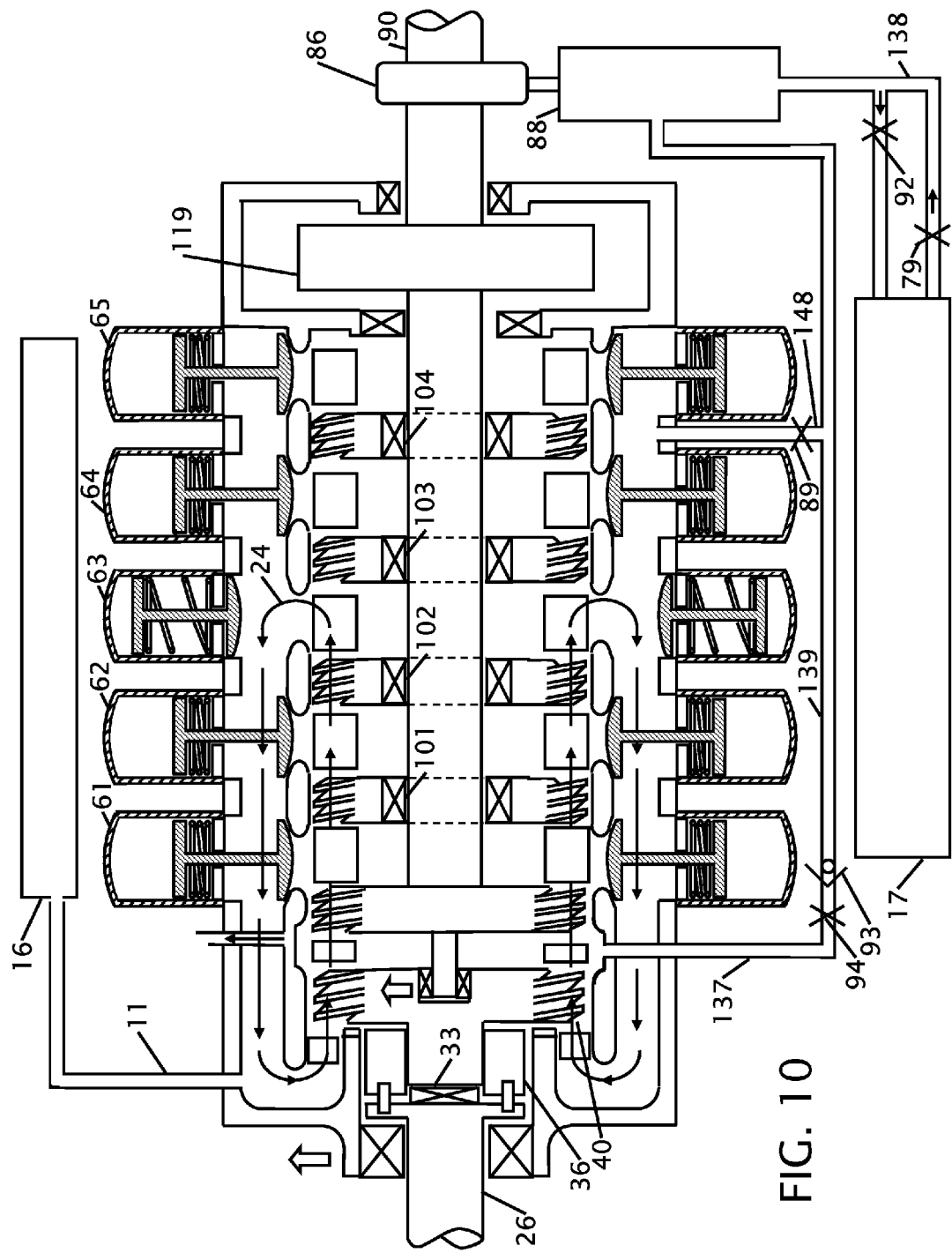
FIG. 10 shows the five speed hydraulic hybrid turbo transmission with one planetary gear with a reservoir, an accumulator and a pump/motor.

FIG. 10 shows the five speed hydraulic hybrid turbo transmission with one planetary gear with a pump/motor 88. In this embodiment of the hydraulic hybrid turbo transmission where a low pressure fluid storage tank 16 holds and supplies hydraulic fluid to the system. Pipe 11 supplies the hydraulic fluid from the storage tank into the body of the hydraulic hybrid turbo transmission. This embodiment also has a high pressure storage tank accumulator 17. When the brakes are applied valve 94 will open and hydraulic fluid will be pumped from the pump 40 through pipe 139 and into a second pump/motor 88 that is driven by drive 86 that will further increase the pressure of the hydraulic fluid and pump the higher pressure fluid through valve 92 and into the high pressure reservoir accumulator 17. The valve 89 and valve 97 will be closed when the user presses the accelerator, throttling valve 97 will open and high pressure hydraulic fluid will be passed back through pipe or tube 138 back into the pump/motor 88 where it will turn the drive 86 that will turn output shaft 90 to propel the vehicle. The valves 89 and 97 will be open and the valves 92 and 94 will be closed/

FIG. 11 shows a cross-sectional view of two planetary gear sets 120. The first gear set is used in driving mode where it locks the multi-disc clutch 32. In reverse mode, braking band 127 is locked. For neutral, the multi-disc clutch 32 and the brake band 127 is free and the system has a piston 109 that pushes against the multi-disc clutch 32, planetary gear carrier 35, planetary gear 107, sun gear 108 and common ring gear 126. The ring gear 126 has a one-way clutch to let the ring gear 105 turn on only one direction. The second planetary gear is used either for forward mode where the turbines act as motors by locking the multi-disc clutch 32. For reverse mode, the turbines act as pumps when the brakes are applied. The reverse mode is performed by locking the brake band 128 and releasing the disc clutch 32.

Figure 12:
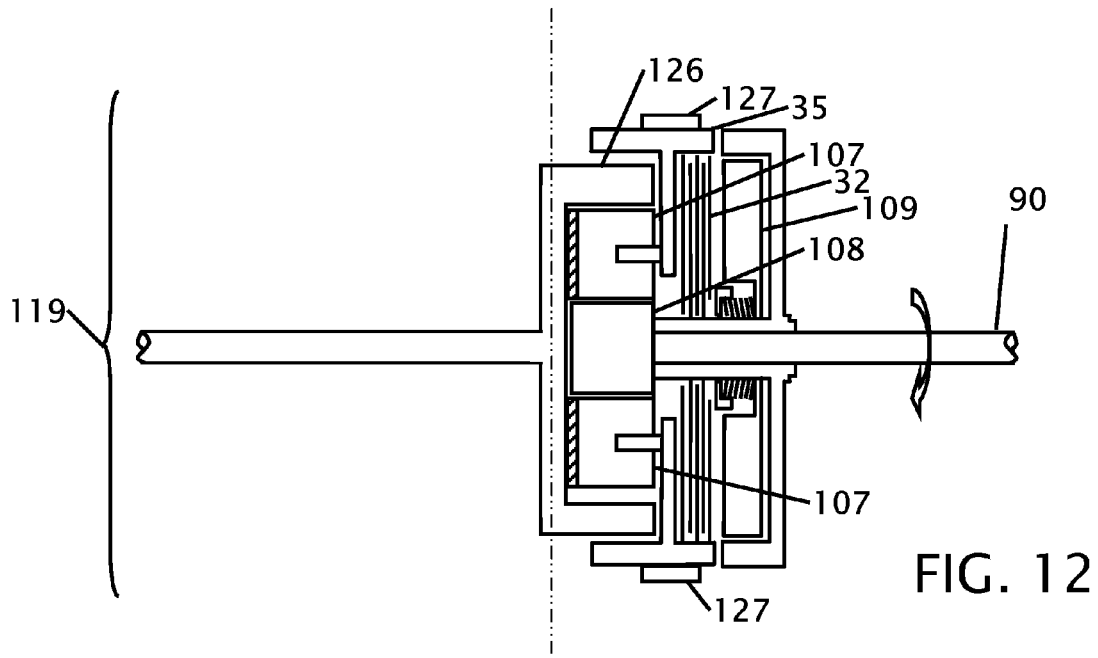
FIG. 12 shows a side cross sectional view of one planetary gear set.

FIG. 12 shows a cross sectional view of one planetary gear set 119 and is similar to the first gear shown and disclosed in FIG. 11.

Figure 13:
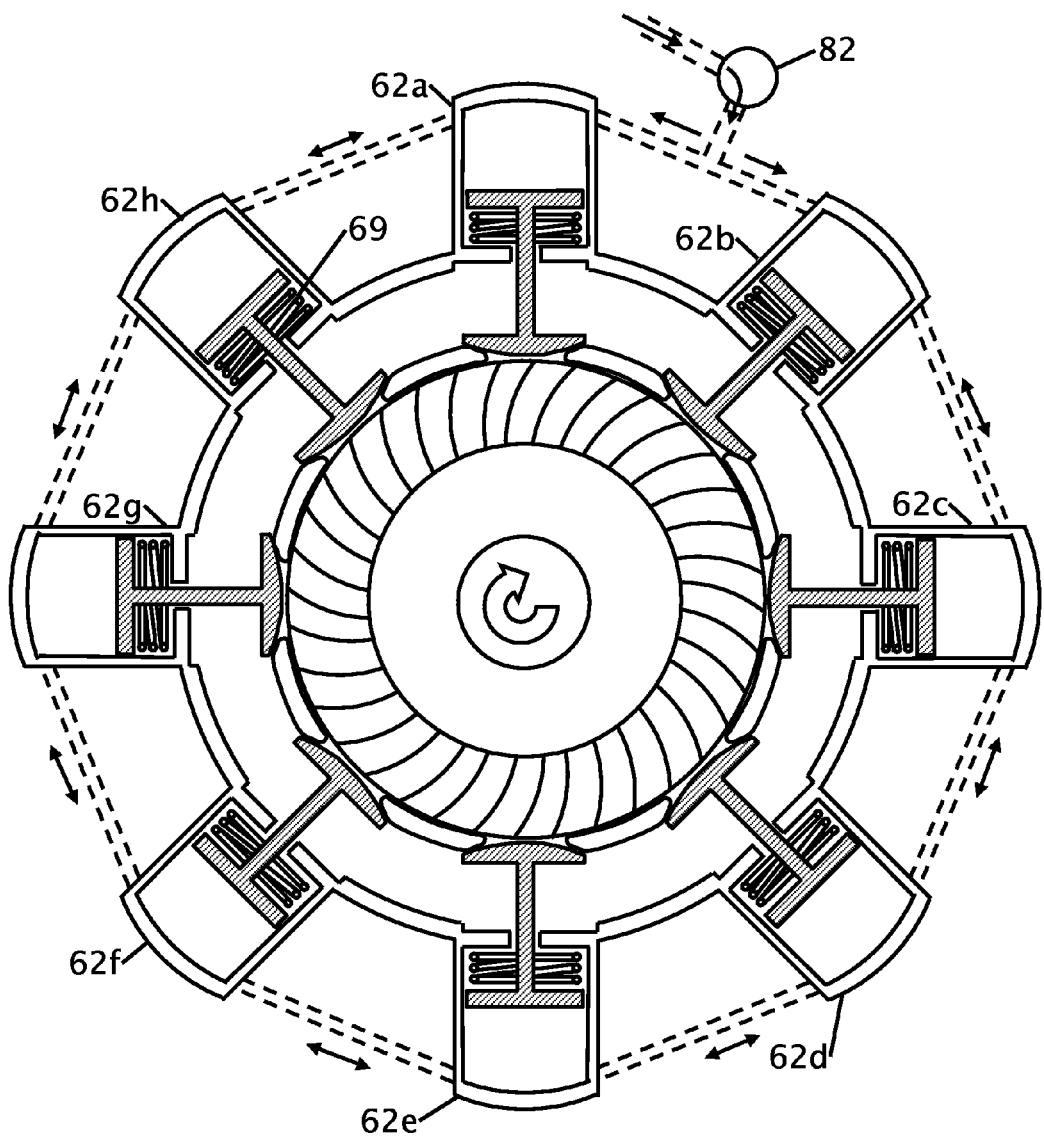
FIG. 13 shows a front cross sectional view of one turbine of a hydraulic hybrid turbo-transmission with the valves closed.

FIG. 13 shows a front cross sectional view of one turbine of a Hydraulic hybrid turbo-transmission with the valves closed. FIG. 9 shows a front cross sectional view of one turbine of a Hydraulic hybrid turbo-transmission with the valves open.

While it is shown with eight valves 62a-62h existing around the hydraulic hybrid turbo-transmission it is contemplated that more or less than eight valves can be used. In FIG. 8, the solenoid, 82 is open and flow enters all the valves 62a-62h, whereby pushing the valves closed. In this orientation flow will be blocked from exiting the opening after turbine 52 (not shown). In FIG. 9, the solenoid, 82 is closed and flow is blocked from all the valves 62a-62h, whereby allowing flow 39 through the opening after turbine 52 (not shown). Note that the spring(s) 69 maintains the valve(s) open in FIG. 14.

Figure 14:
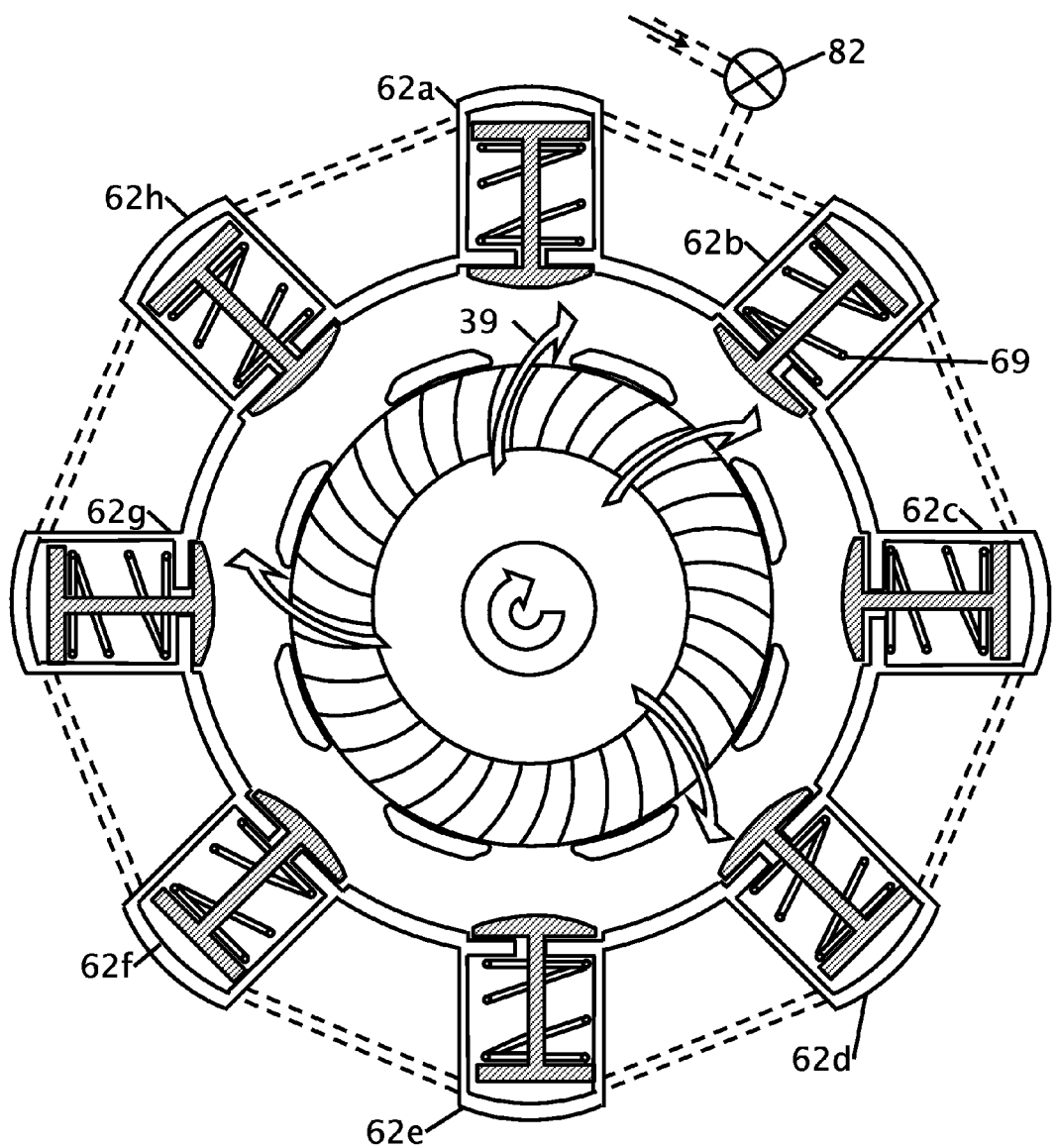
FIG. 14 shows a front cross sectional view of one turbine of a hydraulic hybrid turbo-transmission with the valves open.

FIG. 14 shows a partial isometric view of one-way overrunning clutches or roller clutches that connect the speed turbines to the driven shaft. This figure shows one contemplated embodiment of a one way clutch using a plurality or dogs or sprags 130 connected around a shaft 90. When the turbine 132 turns in one direction the dogs or sprags 130 grip onto the shaft 90 to turn the shaft. When the turbine 132 stops or turns 133 in the opposite direction, the dogs or sprags release the shaft and allows the turbine to free spin on the shaft 90. While dogs or sprags are shown and described a number of other one-way clutches or bearing are contemplated that perform equivalently.

FIG. 15 shows a partial isometric view of a multiple disc clutch that connects the speed turbines to the driven shaft. FIG. 16 shows a side cross-sectionals view of a multiple-disk clutch used in the Hydraulic hybrid turbo-transmission. FIG. 16 shows a shaft 90 connected to a multi-disc clutch plate 32 through bearing 131. The multi-disc clutch pack 32 is shown with more detail in FIG. 17. This configuration uses the pressure of the output flow 25, which comes from the pump, to go through opening 138 to push piston 139 and lock the disk clutch 141. The moving clutch plate has the turbine blades 132 to provide rotational motion 133 on the output shaft 90. In addition to the output flow 25 entering the opening 138 flow will also move through the nozzle(s) 140.

Figure 17:
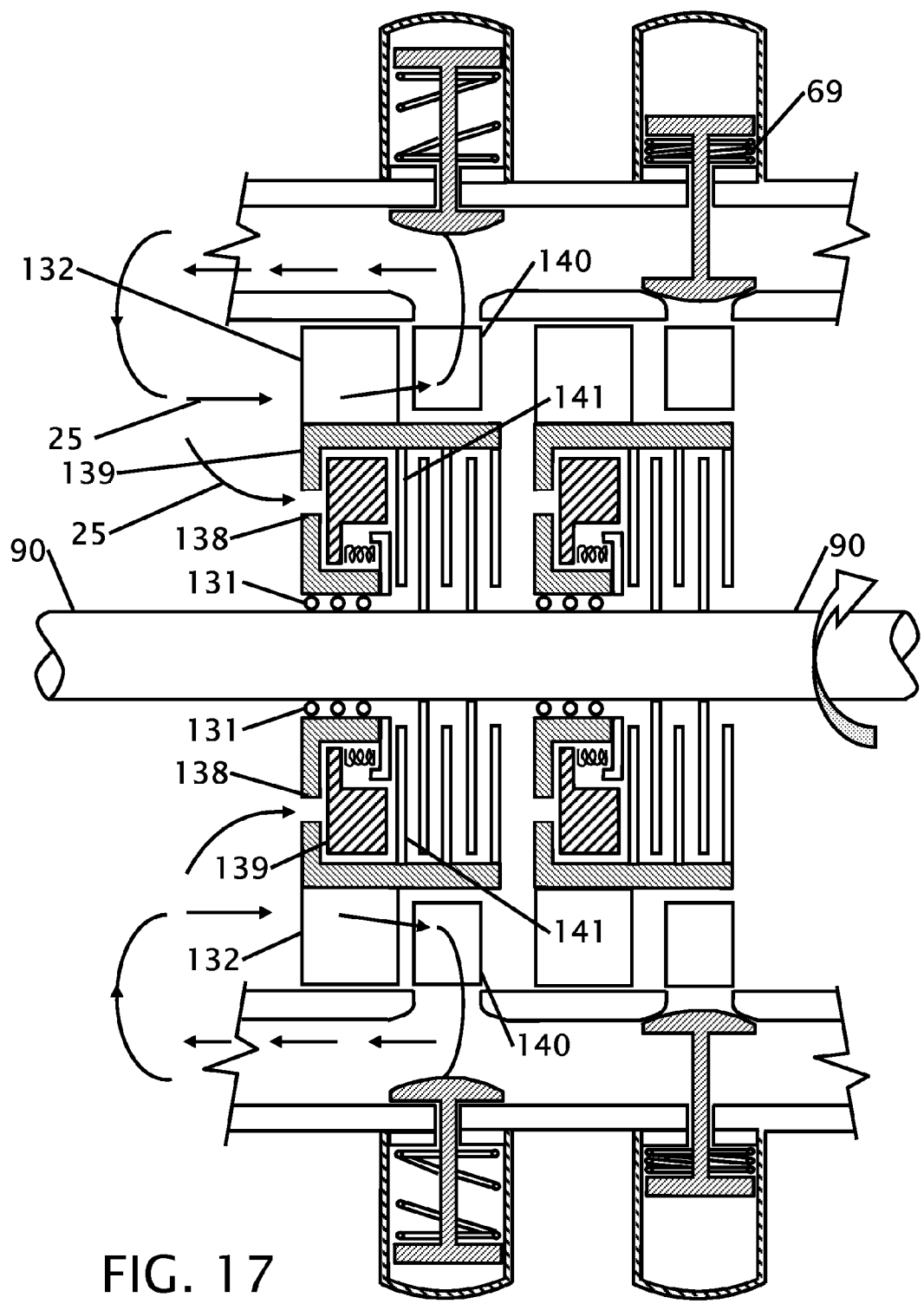
FIG. 17 shows a side cross-sectionals view of a multiple-disk clutch used in the hydraulic hybrid turbo-transmission.

FIG. 17 shows a partial cross-sectional view of the turbine with a multiple-disc clutch connected to output shaft 90 with bearing 131. When the differential pressure before or after the turbine is sufficient to turn the turbine and lock the multi-disc clutch then the power will transfer to output shaft 90. The pressure 25 will turn the turbine 132 and push through opening 138 where it will push piston 139 against the disk clutch 141 and lock the turbine to output shaft 90.

FIG. 18 shows a side cross sectional view of a three speed hydraulic hybrid turbo-transmission with a direct drive clutch with all of the details of FIG. 18 that were explained in FIG. 5 except for the clutch. The clutch is a multi-disc clutch that locks-up shaft 26 with shaft 90 as a mechanical lock for direct drive. The transmission shown in FIG. 5 uses a hydraulic lock for direct drive while in FIG. 18 the transmission uses a mechanical lock or hydraulic lock for direct drive where the other gears use all hydraulic locks. The mechanical lock includes a multi-disc clutch 32, a piston plate 109, a spring return for the piston 45, a secondary pump 46 and a solenoid valve 56 for operation of the piston plate 109. To operate the direct drive, the fluid flows through pipe 37 and then through pipe 41 into pump 46. This pump increases the pressure of the hydraulic fluid. The higher pressure fluid exits the pump 46 and through pipe 42 where it is controlled by solenoid valve S6. When valve S6 is opened, fluid will flow through pipe 43 and through flow conduit 44 that flows through the input shaft 26. When high pressure hydraulic fluid enters behind pressure plate piston 109 the pressure will overcome return springs 45 and the multi-disc clutch plates 32 will be forced together thereby positively locking the input 26 and output 91 shafts together. When the solenoid valve 56 is closed, the multi-disc clutch 32 disengaged and the pump 132 and the turbines will run at different speeds for different gear ratios. All of the solenoid valves are controlled by a transmission controller.

Thus, specific embodiments of a hydrodynamic hydraulic hybrid turbo-transmission have been disclosed. It should be apparent, however, to those skilled in the art that many more modifications besides those described are possible without departing from the inventive concepts herein. The inventive subject matter, therefore, is not to be restricted except in the spirit of the appended claims.

What is claimed is:

1. A hydraulic hybrid turbo transmission apparatus configured to transmit energy from a power source to a work unit the hydraulic hybrid turbo transmission apparatus comprising:
   an outer housing defining an interior region containing a fluid;
   an input shaft being coupled to a power source to receive energy there from;
   said input shaft being coupled to at least one pump to transfer energy from said power source into the fluid and then to a multi-stage turbine;
   a first turbine positioned in front of said pump that is fixed to an output shaft that rotates in a first direction of rotation;
   at least a second turbine or subsequent turbine(s) located in series after said first turbine that is rotationally secured to said output shaft with a one-way overrunning clutch or multiple-disc clutch;
   at least one storage tank for storing low pressure fluid;
   a plurality of valves located after each turbine that are opened to discharge fluid after each turbine or closed to allow flow to said second or subsequent turbine(s);
   said plurality of valves are opened or closed under control of corresponding solenoids to change a drive ratio between said input shaft and said output shaft wherein;
   said one-way overrunning clutch or multiple-disc clutch is lockable in the said first direction of rotation of said first turbine and be free to rotate in an opposing direction of rotation without appreciable drag being placed on said output shaft;
   said turbines transfers power when a differential pressure before and after said turbines is sufficient to turn said turbines and lock said one-way overrunning clutch or multi-disc clutch and to transfer power to said output shaft;
   said hydraulic hybrid turbo transmission further includes a clutch between said pump and said first turbine wherein said clutch locks said pump to said turbine for direct drive, and
   when said clutch is not locked, said pump and said turbines run at different speeds for different gear ratio.

2. The hydraulic hybrid turbo transmission apparatus according to claim 1 having at least a third turbine wherein said turbines before said open valves are in driven rotation and said turbines after the last open set of said valves are in free rotation on said output shaft because no fluid is flowing through the remaining turbines.

3. The hydraulic hybrid turbo transmission apparatus according to claim 1 wherein said first turbine has a different blade size and or angle from said at least a second turbine to create a different gear ratio.

4. The hydraulic hybrid turbo transmission apparatus according to claim 1 wherein all of said corresponding solenoids are operable manually to act as a manual transmission or by a transmission control module that acts as an automatic transmission.

5. The hydraulic hybrid turbo transmission apparatus according to claim 1 wherein all said valves operate by pressurized fluid that is created by said pump through said corresponding solenoids.

6. The hydraulic hybrid turbo transmission apparatus according to claim 1 that further includes a planetary gear set, sun gear, carrier, ring gear that provides reverse, neutral, and forward operations.

7. The hydraulic hybrid turbo transmission apparatus according to claim 1 wherein said transmission uses two separate controllers wherein a first controller controls the turbine operation and a second controller controls a vehicle operation for a reverse, a neutral and a forward direction of vehicle travel.

8. The hydraulic hybrid turbo transmission apparatus according to claim 1 wherein the number of turbines in said transmission corresponds to the number of gears;
   there are five turbines in the transmission, wherein operation of said first turbine corresponds to a fifth gear or overdrive gear, operation of said first and second turbine corresponds to a fourth gear operation of a first, second and third turbine corresponds to a third gear operation of said first, second, third and fourth turbine corresponds to a second gear operation and operation of said first, second, third, fourth and fifth turbine corresponds to a first gear.

9. The hydraulic hybrid turbo transmission apparatus according to claim 1 wherein said second turbine is connected to said one-way overrunning clutch whereby said second turbine transfers power when differential pressure before and after said second turbine is sufficient to run said one-way overrunning clutch and engage with said output shaft.

10. The hydraulic hybrid turbo transmission apparatus according to claim 1 wherein said at least a second turbine is connected to said one-way clutch or multi-disc clutch whereby said at least a second turbine transfers power when a differential pressure before and after said at least a second turbine is sufficient to lock said one-way clutch or multi-disc clutch and engage with said output shaft.

11. The hydraulic hybrid turbo transmission apparatus according to claim 1 that further includes energy recovery from a braking system and from said pump attached to an engine comprising:
   a high pressure accumulator configured to receive and store hydraulic fluid during braking and then deliver said high pressurized hydraulic fluid to said first turbine in said transmission during acceleration;
   a first planetary gear set, sun gear, carrier, ring gear that provides reverse, neutral, and forward operation of a vehicle;
   a second planetary gear set, sun gear, carrier and ring gear located between last turbine and said first planetary gear;
   wherein a turbine shaft located before said second planetary gear set turns in the same direction of said output shaft located after said second planetary gear set, therefore all turbines act as a motor;
   when brakes are applied said turbine shaft operates in a reverse rotation by said second planetary gear set, therefore all of said turbines act as pumps that pump low pressure fluid to an accumulator through a conduit having a valve that is opened when said brakes are applied;
   regenerative braking system converts kinetic energy from slowing a vehicle into high pressurized fluid that is stored in said high pressure accumulator;

said high pressure fluid is transferred to said first turbine through a conduit having a throttling valve that is operated by a gas pedal or by a vehicle control unit of said vehicle;

said vehicle operates as a fully or partially hydraulic vehicle as needed, and an electrical and hydraulic control coordinated between said braking and vehicle control of said vehicle based upon action of a user.

12. The hydraulic hybrid turbo transmission apparatus according to claim 1 that further includes energy recovery from a braking system and from said pump attached to the engine comprises:

a high pressure accumulator configured to receive and store a high pressure fluid and deliver said high pressure fluid to said first turbine is said transmission;

a regenerative braking system whereby braking converts kinetic energy from slowing a vehicle into high pressurized fluid that is stored in a high pressure accumulator;

said kinetic energy is used to turn a pump located after said transmission and to further pressurize fluid that is initially pressurized by said at least one pump to create a higher pressurized fluid in said accumulator;

said high pressure fluid from said accumulator is then transferred to a first turbine engine through a conduit having a throttling valve that is operated by a gas pedal or by a vehicle control unit of said vehicle;

under normal operation a valve located between said at least one main pump and a second pump after said transmission is closed and is opened when the brakes are applied;

said vehicle operates as a fully or partially hydraulic vehicle as needed, and an electrical and a hydraulic control coordinates between said braking and vehicle control of said vehicle based upon actions of a user.

13. The hydraulic hybrid turbo transmission apparatus according to claim 1 that further includes energy recovery from a braking system and from engine through a pump comprises:

a high pressure accumulator configured to receive high pressure fluid under pressure and deliver said high pressure fluid to said first turbine is said transmission;

a regenerative braking system whereby braking converts kinetic energy from slowing a vehicle into high pressurized fluid that is stored in a high pressure accumulator;

said kinetic energy is used to turn a pump/motor unit, located after said transmission and to further pressurize fluid that is initially pressurized by said at least one pump in said transmission to create a higher pressurized fluid in said accumulator;

said high pressure fluid from said accumulator is then transferred to said pump/motor unit, through a pipe having a throttling valve that is operated by a gas pedal or by a vehicle control unit of said vehicle;

under normal operation a valve located between said at least one pump and, said pump/motor unit, is closed and is opened when the brakes are applied;

aid vehicle operates as a fully or partially hydraulic vehicle as needed, and an electrical and a hydraulic control coordinates between said braking and vehicle control of said vehicle based upon actions of a user.

* * * * *